W. R. TOWNE.
POTATO SEED PLANTER.
APPLICATION FILED SEPT. 16, 1918.
1,327,971.
Patented Jan. 13, 1920.
3 SHEETS—SHEET 2.
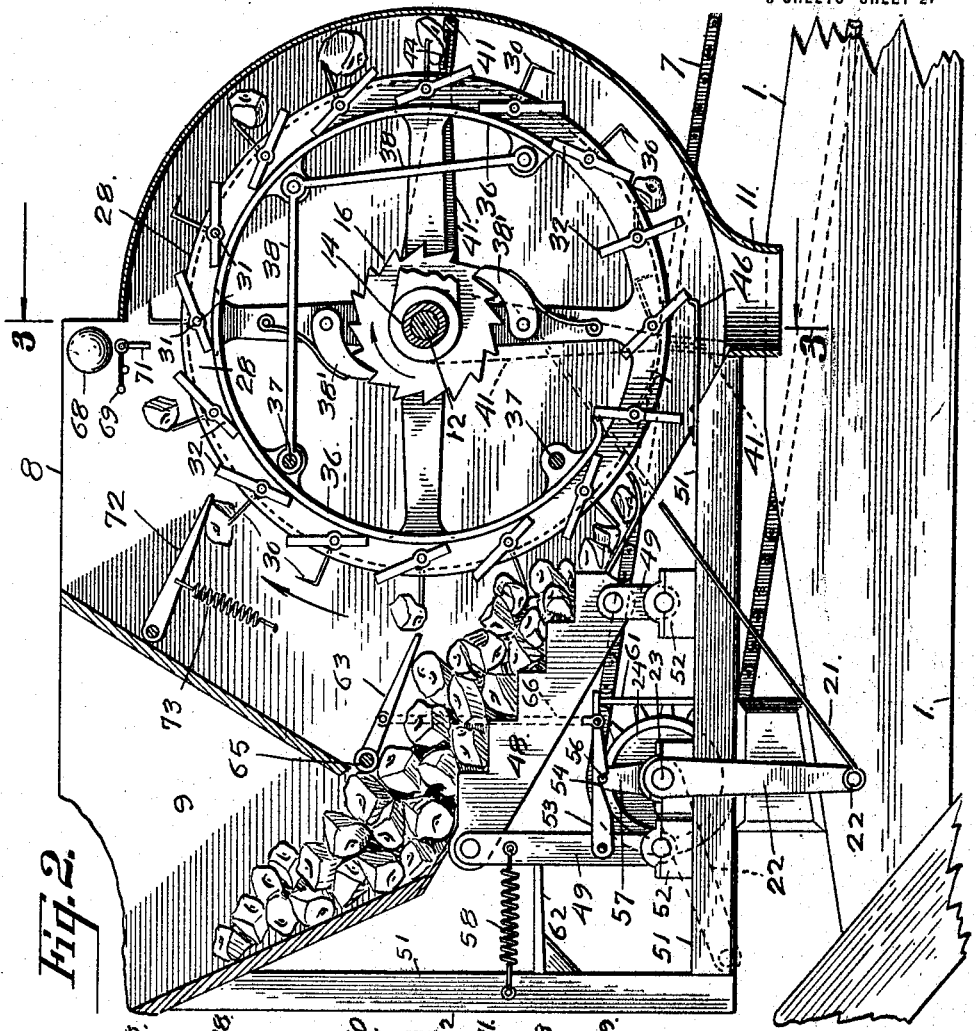
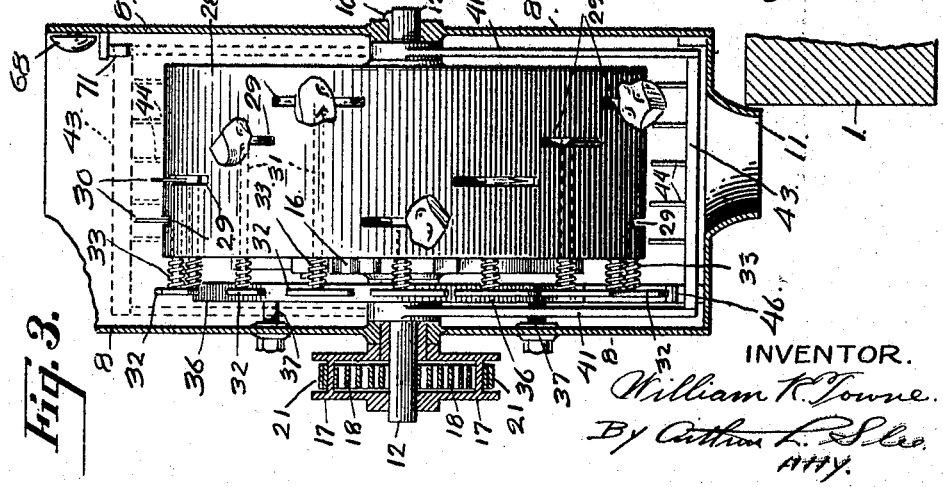
INVENTOR.
William R. Towne.
By Arthur L. Slee
Atty.

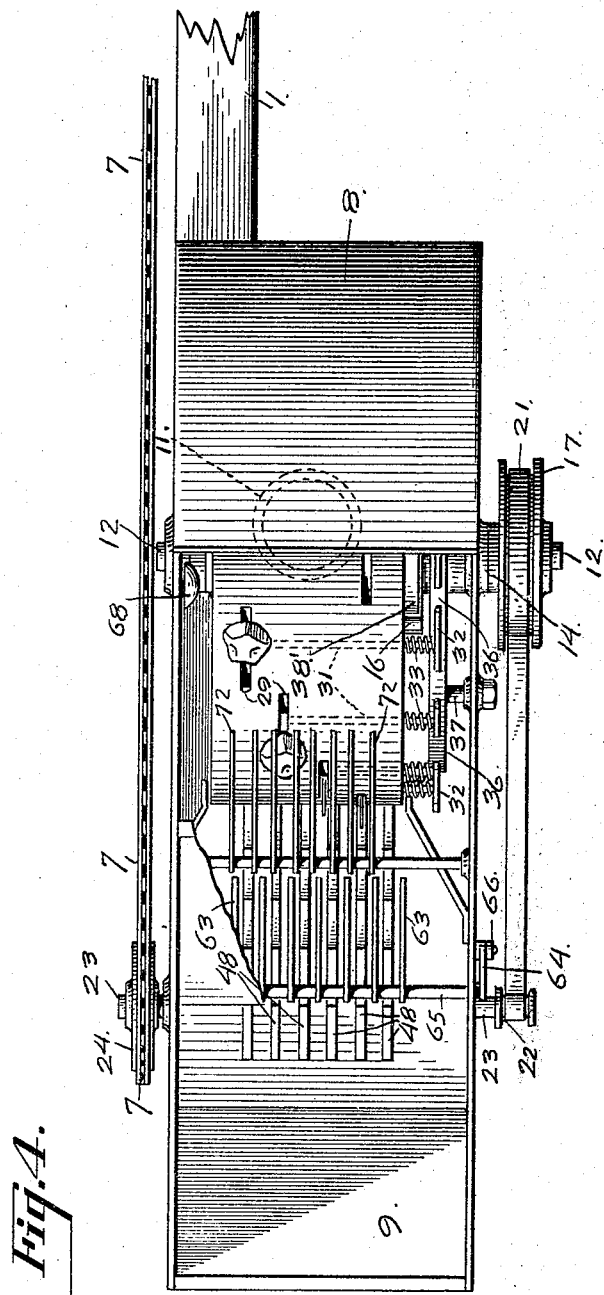

UNITED STATES PATENT OFFICE.

WILLIAM R. TOWNE, OF SAN FRANCISCO, CALIFORNIA.

POTATO-SEED PLANTER.

1,327,971.  Specification of Letters Patent.  Patented Jan. 13, 1920.

Application filed September 16, 1918. Serial No. 254,858.

*To all whom it may concern:*

Be it known that I, WILLIAM R. TOWNE, a citizen of the United States, residing in the city and county of San Francisco, State of California, have invented a new and useful Improvement in Potato-Seed Planters, of which the following is a specification.

My invention relates to improvements in potato seed planters wherein a selector operates in conjunction with a seed carrier to deposit seed potatoes at regular intervals within a furrow made by a plow or the like.

The primary object of the invention is to provide improved means for depositing seed potatoes at regular intervals within a furrow.

A series of carriers are mounted within a hopper containing the seeds to be planted and pass through a number of seeds to impale a seed on each carrier.

A selector operates at regular intervals to move the nearest seed containing carrier to a point directly above a chute leading behind the plow-share at which point the carrier is actuated to release the seed into the carrier.

It is also an object of the invention to provide improved means for maintaining a sufficient quantity of seeds in the path of the carriers to insure impalement or engagement of a seed on substantially every carrier.

A further object of the invention is to provide improved means for increasing the engagement of the seed with a carrier after being slightly or probably insufficiently impaled or engaged.

I accomplish these several objects by means of the improved device disclosed in the drawings forming a part of the present specification wherein like characters of reference are used to designate similar parts throughout the said specification and drawings, and in which—

Fig. 2 is a broken view of the device on an enlarged scale, partly in section, and with the side plate nearest the observer removed;

Fig. 3 is a transverse sectional view taken on line 3—3 of Fig. 2 in the direction indicated, the drum and carriers, and the operating mechanism therefor being shown in full; and Fig. 4 is a plan view of the device.

Figure 1:
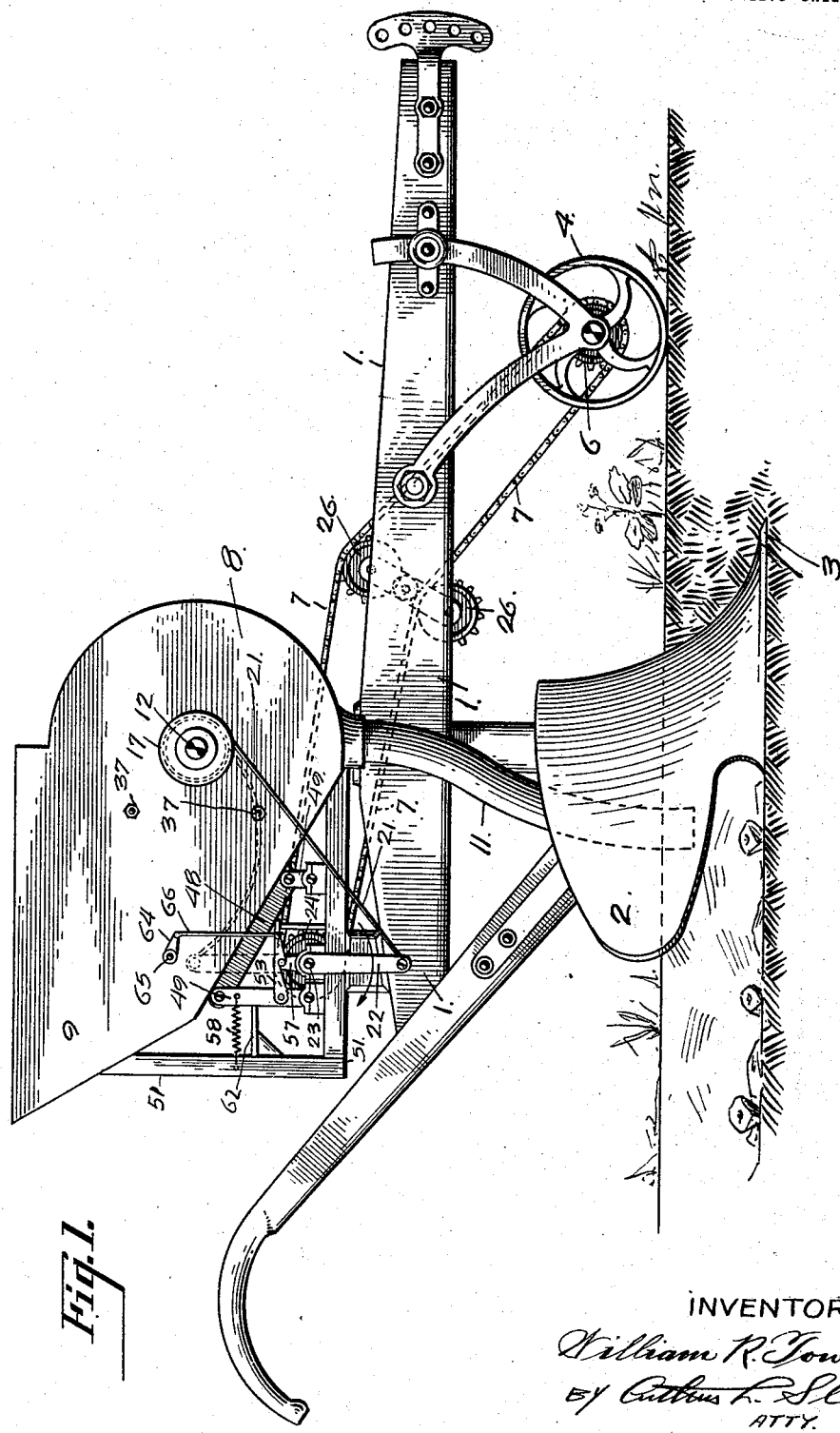
Figure 1 is a side elevation of my improved device attached to a plow.

Referring to the drawings the numeral 1 is used to designate the beam of a plow having the usual mold 2 and plow-share 3. The usual wheel 4 is also provided the axle of which has secured thereto a sprocket 6 operating a chain 7, the purpose of which will hereinafter be more fully described.

A hopper 8 is mounted upon the beam 1 preferably at a point above the plow-share 3, said hopper 8 being provided with what I term a super-hopper 9 and a chute 11 leading from said hopper 8 to the rear of the plow-share 3 and also back of the mold 2 so that potato seed dropped through said chute 11 will be deposited within a furrow made by the plow.

A shaft 12 is mounted transversely within the hopper 8 and above the chute 11, said shaft being rigidly connected at one end to the hopper 8 as at 10 in Fig. 3 of the drawings. A sleeve 14 is rotatably mounted upon the shaft 12 and is provided with a ratchet 16 and a hollow flanged pulley 17 on the end of said sleeve 14 opposite the rigidly secured end of the shaft 12. A suitable spring 18 is coiled under tension between the pulley 17 and the end of the rigid shaft 12 and in a direction which will tend to normally rotate the pulley 17 anti-clockwise.

A flexible connection 21 is wound upon the pulley 17 and has the free end thereof attached to a wrist pin or crank 22 on an operating shaft 23 having a sprocket 24 on the opposite end thereof driven by the hereinbefore mentioned chain 7 in engagement with the sprocket 6 on the shaft of the plow wheel 4, said chain 7 being suitably supported on idler sprockets 26 pivotally mounted upon the plow-beam 1 as disclosed in Fig. 1 of the drawings.

A drum 28 is rotatably mounted upon the sleeve 14 and is provided with a series of staggered slots 29 through which project impaling hooks or seed carriers 30 which are pivotally mounted within the drum 28 and provided with shafts 31 which project beyond one side of said drum 28 and terminate in operating levers 32. A spring 33 is connected between each shaft 31 and the drum and tensioned to normally tend to rotate each shaft 31 anti-clockwise to retract the carrier 30 thereon within the periphery of the drum 28 through its respective slot 29, the purpose of which will hereinafter be more fully described.

A stationary cam 36 is arranged at one side of the drum 28 to engage the levers 32 to actuate the carriers 30, said cam being held in position by suitable studs 37 projecting inwardly from the inner surface of one wall of the hopper 8, and struts or standards 38 projected from one of said studs 37. This is to permit the passage of the arms of a selector 41 secured to the sleeve 14 and connected at the free ends thereof with a bar 43 having a plurality of teeth 44 arranged in such spaced relation that an empty carrier may pass between said teeth 44 but a carrier 30 containing a seed potato will arrest the further progress of said teeth 44 and selector 41 for the reason that through the medium of the spring 18 the selector 41 is being rotated anti-clockwise or in the direction which will engage a seed on the carrier 30 and tend to move said seed farther onto rather than off of its respective carrier, as disclosed in Figs. 2 and 3 of the drawings.

The arms of the selector 41 are arranged to pass on either side of the drum 28 and the cam 36 while moving anti-clockwise through its extreme arc from the dotted position shown in Fig. 2 of the drawings to the upper stud 37 in the same figure.

The drum 28 has operatively connected thereto a pair of spring controlled pawls 38' which are engaged by the ratchet wheel 16 on the sleeve 14 to rotate said drum 28 when the selector 41, connected to the ratchet wheel 16, is moved clockwise by the crank 22 and the flexible connecting rod 21 connected to the pulley 17 on the end of said sleeve 14.

A stop 46 is located adjacent the top of the chute 11 in the bottom of the hopper 8 to engage the levers 32 and thereby to retract each of the carriers 30 into the drum 28 through its respective slot 29 and thereby release the seed potato thereon into the chute.

A feeding mechanism for feeding seed potatoes within the hopper 8 into the path of the rotating carriers 30 is provided in the shape of serrated members 48 which are oscillated by links 49 pivotally connected thereto and to the frame 51 of the hopper 8 by means of suitable bearings 52 and a latch 53 having a recess 54 therein which is engaged by a pin 56 on an arm 57 extending from the power shaft 23. As the shaft 23 rotates, the pin 56 on the arm 57 engages the notch or recess 54, of the latch 53 and moves the links 49 and serrated members 48 forward against the tension of a suitable spring 58 until the said pin 56 carries the free end of the latch 53 against a stop 61 which stop releases the latch 53 from said pin 56 and permits the tension of the spring 58 to return one of the links 49 against a second stop 62. This reciprocating movement of the members 48 moves seed potatoes within the hopper 8 forward continually and into the path of the carriers 30.

In order to prevent a greater number of seeds than may be required from being moved into the path of the carriers 30, I have provided a transverse comb 63 pivotally mounted within the hopper 8 which is raised by a predetermined number of seeds within said hopper 8 to raise a lever 64, on the outer end of a shaft 65 to which the comb 63 is connected, and a connecting rod 66 connected to the latch 53.

The latch 53 is thus raised and moved from the path of the pin 56 so that the seed moving mechanism as represented by the members 48 is automatically disconnected from the operating means therefor when a predetermined number of seeds have been moved into the hopper 8 and the path of the carriers 30.

A bell 68 or other suitable alarm is struck by a hammer 69 connected to a latch 71 hung within the path of the bar 43 connected to the selector arms 41 when said arms are moved by the tension of the spring 18 and the return throw of the crank 22 to a point beyond said latch 71 thereby indicating the absence of potato seeds on the carriers 30 moving between the point above the chute 11 and the hopper 8.

It is obvious that when any of the carriers 30 between the chute 11 and the upper stud 37 contain a seed said seed will engage the teeth 44 of the bar 43 and thereby prevent a further return movement of the selector arms 41.

In operation, the wheel 4 and sprocket 6 drive the chain 7 to rotate the shaft 23 which in turn rotates the crank 22 on the end of said shaft and causes the flexible connection 21 to move the pulley 17 and the sleeve 14 and selector 41 a proportionate degree. The connection 21 being flexible it is obvious that the return movement of the crank 22 will permit the selector 41 to rest against the seed containing carrier 30 nearest the top of the chute 11 and the next successive movement of the crank 22 will, after taking up the slack in the flexible connection 21, move said carrier to a point directly above the chute 11.

Therefore, it is obvious that a carrier 30 containing a seed will be moved to a point directly over the top of the chute 11 at every revolution of the shaft 23 so that a seed will be deposited through the said chute 11 and into the furrow directly back of the plow at regular intervals.

As the drum 28 is intermittently revolved by the selector 41 operating through the pawl and ratchet 38′ and 16 respectively, the levers 32 are engaged by the cam 36 to project the carriers 30 through their respective slots 29 in the drum 28 and against the tension of each respective spring 33.

As the carriers 30 move upward through the potato seeds one of said seeds is impaled upon each carrier and carried upward until a second comb 72 is encountered having a spring 73 attached thereto to bring a pressure upon said seed as disclosed in Fig. 2 of the drawings. As the drum 28 is intermittently rotated each carrier eventually reaches the end of the cam 36 and the tension of the spring 33 on the shaft 31 of the carrier 30 retracts said carrier through its respective slot 29 as far as permitted by the seed impaled on said carrier 30.

This movement will cause one end of the operating lever 32 on the shaft 31 to project substantially radially from the periphery of the drum 28 and the stop 46 in the path of said projected end will engage said end and further retract the carrier within its respective slot to release the seed thereon into the chute 11.

It is obvious from the foregoing that the return throw of the crank 22 will release the selector 41 and teeth 44 carried thereby and permit said selector to be moved, by the tension of the spring 18 actuating the sleeve 14 upon which the selector 41 is mounted, to the seed containing carrier nearest the top of the chute 11 when further movement of said selector will be prevented by said seed which engages the teeth 44 so that the next movement of the crank 22 will move said seed containing carrier to a point where it will be actuated by the stop 46 to release the seed into the chute 11.

It is also obvious that as the selector 41 moves anti-clock-wise on its return movement the ratchet 16 will be moved in the same direction and will thus slidably engage the pawls 38′ on the drum 28. As the selector 41 again moves forward the ratchet 16 will engage the pawls 38′ so as to rotate the drum 28 through an arc equal to the arc through which said selector 41 moves thereby moving the seed containing carrier 30 nearest the top of the chute 11 to a point directly over said chute.

It is obvious that the staggered arrangement of the carriers 30 on the periphery of the drum 28 will tend to greatly facilitate the impalement of seeds upon the said carriers as said staggered arrangement will operate to shuffle the seeds within the hopper 8 and thereby prevent them from piling at any one location.

It is also evident that regardless of the interspersed positions of vacant carriers moving from the hopper 8 to the chute 11 the selector 41 will always move to the seed containing carrier nearest the chute 11 on its return movement and during its forward movement will always move said carrier to a point directly over the chute 11.

Having thus described my invention, what I claim as new and desire to secure by Letters Patent is—

1. The combination with a hopper, of a chute leading from the hopper, a series of carriers mounted within the hopper and arranged to carry seed potatoes from the hopper, means for moving the carrier containing a seed potato nearest the chute to a point directly over the chute at regular intervals; and means for actuating the carrier to release the seed therefrom into the chute.

2. The combination with a hopper, of a chute leading from the hopper, a series of carriers mounted within the hopper and arranged to carry seed potatoes from the hopper, means for moving the carrier containing a seed potato nearest the chute to a point directly over the chute at regular intervals; and means for actuating the carrier to release the seed therefrom into the chute; and means for indicating the absence of seeds on the carriers.

3. The combination with a hopper, of a chute leading from the hopper, a series of carriers mounted within the hopper and arranged to carry seed potatoes from the hopper, means for moving the carrier containing a seed potato nearest the chute to a point directly over the chute at regular intervals; means for actuating the carrier to release the seed therefrom into the chute; a suitable alarm; and means for sounding the alarm when a majority of the carriers fail to contain a potato seed.

4. The combination with a hopper, of a chute leading from the hopper, a series of carriers mounted within the hopper and arranged to carry seed potato from the hopper, means for moving the carrier containing a seed potato nearest the chute to a point directly over the chute at regular intervals; means for actuating the carrier to release the seed therefrom into the chute; means for indicating the absence of seeds on the carriers; and means for automatically increasing the engagement of each carrier with its respective seed.

5. The combination with a hopper, of a super-hopper arranged above the hopper; means for automatically regulating the passage of seed potatoes from the super-hopper to the hopper; a chute leading from the hopper; a series of seed carriers mounted within the hopper and arranged to impale and carry seeds from the hopper; means for moving the carrier containing a seed and nearest the chute to a point directly over the chute at regular intervals; and means for actuating the carrier to release the seed thereon into the chute.

6. The combination with a hopper, of a chute leading from the hopper; a series of staggered seed carriers mounted within the hopper to engage seed potatoes within the hopper and to carry said seed therefrom; means for selecting and moving the carrier nearest the chute and containing a seed to a point directly over the chute at regular intervals; and means for releasing the seed from the carrier into the chute.

7. The combination with a hopper, of a chute leading from the hopper, a series of staggered seed carriers mounted within the hopper to engage seed potatoes within the hopper and to carry said seeds therefrom, means for selecting and moving the carrier nearest the chute and containing a seed to a point directly over the chute at regular intervals; means for releasing the seed from the carrier into the chute; and means for indicating an absence of seeds on the carriers moving from the hopper to the chute.

8. The combination with a hopper, of a chute leading from the hopper, a series of staggered seed carriers mounted within the hopper to engage seed potatoes within the hopper and to carry said seeds therefrom, means for selecting and moving the carrier nearest the chute and containing a seed to a point directly over the chute at regular intervals; means for releasing the seed from the carrier into the chute; means for indicating an absence of seeds on the carriers moving from the hopper to the chute; and means for automatically increasing the engagement of each carrier with its respective seed.

9. The combination with a hopper, of a chute leading from the hopper, a slotted drum rotatably mounted within the hopper and over the chute therein; a series of seed carriers pivotally mounted within the drum and arranged to be projected through the slots therein; means for normally retracting the carriers into the drum; means for projecting said carriers through the slots to engage seeds in the hopper and carry said seeds from said hopper, means for selecting the carrier nearest the chute and containing a seed and moving the drum and said carrier so as to bring the carrier to a point directly over the chute at regular intervals; and means for retracting the carrier into the drum to release the seed into the chute when said carrier arrives directly over said chute.

10. The combination with a hopper, of a chute leading from the hopper, a drum rotatably mounted within the hopper over the chute and having a series of staggered slots in the periphery thereof; a series of seed carriers pivotally mounted within the drum and arranged to be projected through the slots therein; means for normally retracting the carriers within the drum; means for projecting the carriers through the slots to engage the seeds within the hopper and carry the same therefrom; and means for moving the drum at regular intervals to carry the seed containing carrier nearest the chute to a point directly over the chute to release the seed thereon into said chute.

11. The combination with a hopper, of a chute leading from the hopper, a drum rotatably mounted within the hopper over the chute and having a series of staggered slots in the periphery thereof; a series of seed carriers pivotally mounted within the drum and arranged to be projected through the slots therein; means for normally retracting the carriers within the drum; means for projecting the carriers through the slots to engage seeds within the hopper and carry the same therefrom; means for moving the drum at regular intervals to carry the seed containing carrier nearest the chute to a point directly over said chute; means for retracting the carrier into the drum at a point directly over the chute to release the seed thereon into said chute; and means for regulating the feeding of seeds into the hopper.

12. The combination with a hopper, of a chute leading from the hopper, a drum rotatably mounted within the hopper over the chute and having a series of staggered slots in the periphery thereof; a series of seed carriers pivotally mounted within the drum and arranged to be projected through the slots therein; means for normally retracting the carriers within the drum; means for projecting the carriers through the slots to engage seeds within the hopper and carry the same therefrom; means for moving the drum at regular intervals to carry the seed containing carrier nearest the chute to a point directly over said chute; means for retracting the carrier into the drum at a point directly over the chute to release the seed thereon into said chute; and means for increasing the engagement of a seed with its respective carrier.

13. The combination with a hopper, of a chute leading from the hopper, a drum rotatably mounted within the hopper over the chute and having a series of staggered slots in the periphery thereof; a series of seed carriers pivotally mounted within the drum and arranged to be projected through the slots therein; means for normally retracting the carriers within the drum; means for projecting the carriers through the slots to engage seeds within the hopper and carry the same therefrom; means for moving the drum at regular intervals to carry the seeds containing carrier nearest the chute to a point directly over said chute; means for retracting the carrier into the drum at a point directly over the chute to release the seed thereon into said chute; and means for indicating the absence of seeds on carriers moving from the hopper to the chute.

14. The combination with a hopper, of a chute leading from the hopper, a drum rotatably mounted within the hopper over the chute and having a series of staggered slots in the periphery thereof; a series of seed carriers pivotally mounted within the drum and arranged to be projected through the slots therein; means for normally retracting the carriers within the drum; means for projecting the carriers through the slots to engage seeds within the hopper and carry the same therefrom; means for moving the drum at regular intervals to carry the seed containing carrier nearest the chute to a point directly over the said chute; means for retracting the carrier into the drum at a point directly over the chute to release the seed thereon into the said chute; and means for moving seeds within the hopper into the path of the carriers.

15. The combination with a hopper, of a chute leading from the hopper, a drum rotatably mounted within the hopper over the chute and having a series of staggered slots in the periphery thereof; a series of seed carriers pivotally mounted within the drum and arranged to be projected through the slots therein; means for normally retracting the carriers within the drum; means for projecting the carriers through the slots to engage seeds within the hopper and carry the same therefrom; means for moving the drum at regular intervals to carry the seed containing carrier nearest the chute to a point directly over said chute; means for retracting the carrier into the drum at a point directly over the chute to release the seed thereon into said chute; means for moving seeds within the hopper into the path of the carriers; means for operating the seed moving means; and means for automatically disconnecting the seed moving means from the operating means therefor when a predetermined number of seeds have been moved into the path of the carriers and for automatically connecting said operating means with the seed moving means when the number of seeds has diminished below said predetermined number.

In witness whereof, I hereunto set my signature.

WILLIAM R. TOWNE.